United States Patent [19]
Burkhard et al.

[11] Patent Number: 5,722,300
[45] Date of Patent: Mar. 3, 1998

[54] MOTOR VEHICLE STEERING COLUMN

[75] Inventors: Terry Edward Burkhard, Bay City; Douglas Matthew Schneider, Bridgeport, both of Mich.

[73] Assignee: General Motors Corporation, Detroit, Mich.

[21] Appl. No.: 704,459

[22] Filed: Aug. 16, 1996

[51] Int. Cl.$^6$ .................................. B62D 1/18; B62D 1/19
[52] U.S. Cl. ..................... 74/493; 280/775; 280/777; 384/41; 384/42; 74/492
[58] Field of Search ..................... 74/493, 492; 384/41, 384/42; 280/775, 777

[56] References Cited

U.S. PATENT DOCUMENTS

| | | | |
|---|---|---|---|
| 3,252,350 | 5/1966 | Zeigler | 74/493 |
| 3,342,080 | 9/1967 | Cantleberry | 74/493 |
| 3,373,629 | 3/1968 | Wight et al. | 74/492 |
| 3,392,599 | 7/1968 | White | 74/492 |
| 3,457,799 | 7/1969 | Lucas et al. | 74/492 |
| 3,476,419 | 11/1969 | Marquis | 403/118 |
| 3,670,591 | 6/1972 | Milton | 74/492 |
| 3,703,105 | 11/1972 | Milton et al. | 74/492 |
| 3,877,319 | 4/1975 | Cooper | 74/492 |
| 4,509,775 | 4/1985 | Arndt | 280/779 |
| 4,667,530 | 5/1987 | Mettler et al. | 74/493 |
| 4,691,587 | 9/1987 | Farrand et al. | 74/493 |
| 4,774,851 | 10/1988 | Iwanami et al. | 74/493 |
| 4,796,481 | 1/1989 | Nolte | 74/493 |
| 4,900,059 | 2/1990 | Kinoshita et al. | 280/775 |
| 4,972,732 | 11/1990 | Venable et al. | 74/493 |
| 5,035,446 | 7/1991 | Arvidsson | 280/775 |
| 5,086,661 | 2/1992 | Hancock | 74/493 |
| 5,243,874 | 9/1993 | Wolfe et al. | 74/493 |
| 5,590,565 | 1/1997 | Palfenier et al. | 74/493 |

FOREIGN PATENT DOCUMENTS 2561605   9/1985   France ................................ 74/493

Primary Examiner—Rodney H. Bonck
Assistant Examiner—Ankur Parekh
Attorney, Agent, or Firm—Saul Schwartz

[57] ABSTRACT

A motor vehicle steering column including a first mast jacket element mounted on a body of the vehicle, a second mast jacket element telescoped into a cylindrical passage in the first element, and a split bushing between the first and second elements. The bushing has a lip on an outside surface thereof which seats against the passage in the first mast jacket element to define a closed circumferential chamber around the bushing interrupted by the split in the latter. A plastic shim is molded in place in the closed circumferential chamber by injecting liquid plastic under pressure through a port in the first mast jacket element. Liquid plastic fills the closed circumferential chamber and clamps an inside surface of the bushing against an outer surface of the second mast jacket element to eliminate lash. Shrinkage of the plastic in the closed circumferential chamber reduces the contact pressure between the bushing and the second mast jacket element to minimize frictional drag.

5 Claims, 2 Drawing Sheets

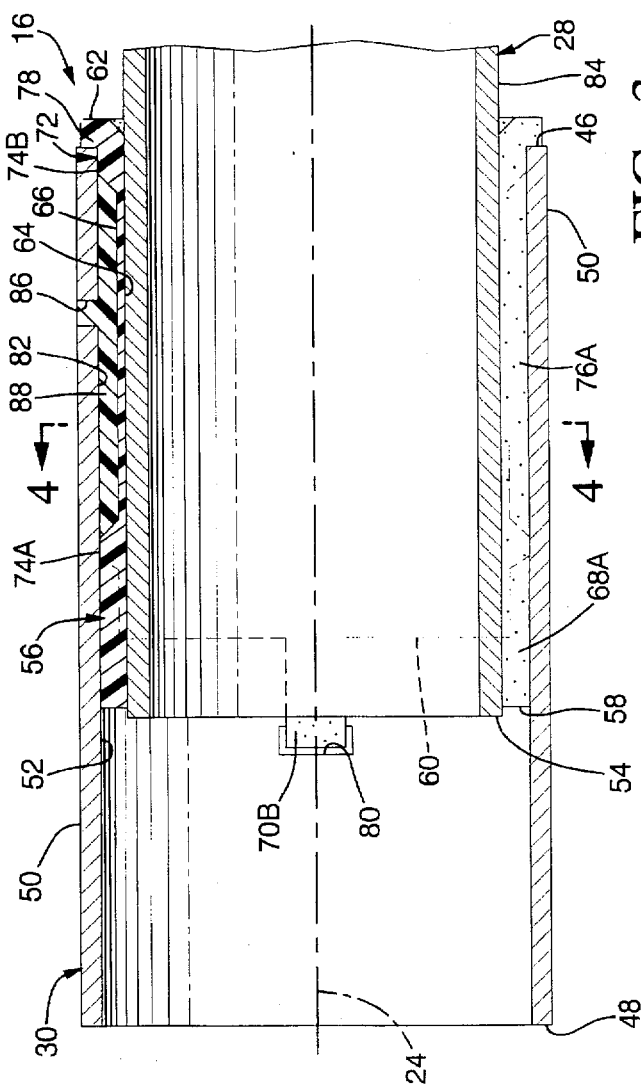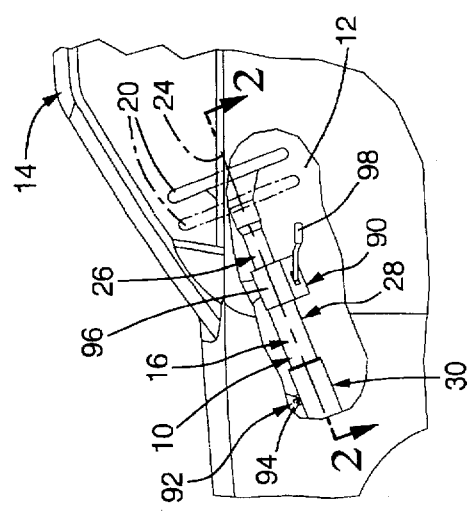

5,722,300

1

MOTOR VEHICLE STEERING COLUMN

FIELD OF THE INVENTION

This invention relates to length-adjustable motor vehicle steering columns.

BACKGROUND OF THE INVENTION

U.S. Ser. No. 08/385490, filed Feb. 8, 1995 now U.S. Pat. No. 5,590,565, and assigned to the assignee of this invention, describes a motor vehicle steering column in which a first tubular element of a mast jacket of the steering column is slidably mounted on a second tubular element of the steering column latter for length adjustment of the steering column by a pair of split plastic bushings. Lash between the telescopically-related tubular elements is eliminated by a pair of frustoconical seats on one of the tubular elements which cooperate with a spring between the bushings to continuously thrust the split bushings radially against the other tubular element. U.S. Pat. No. 5,243,874 describes a motor vehicle steering shaft consisting of a pair of shafts having telescopically-related, contoured end portions and a cured plastic sleeve formed in place between end portions. The cured plastic sleeve bonds to the outer one of the telescopically-related end portions and shrinks during curing to form a uniform tolerance with the inner one of the telescopically-related contoured end portions.

SUMMARY OF THE INVENTION

This invention is a new and improved length adjustable motor vehicle steering column including a mast jacket consisting of an inner element and a center element rigidly connected by an energy absorber and an outer element slidably connected to the inner element through a split bushing. The bushing is a right circular cylinder split in the longitudinal direction having an inside surface, an outside surface, and a lip around the periphery of the outside surface. The bushing snaps into a cylindrical passage in the outer element and expands to effect a seal between the lip and the passage so that a closed circumferential chamber is defined around the bushing. The center element is disposed in the bushing with an outside surface of the center element facing the inside surface of the bushing. A plastic shim is molded in place in the closed circumferential chamber by injecting liquid plastic under pressure through a port in the outer element. Liquid plastic fills the closed circumferential chamber and clamps the inside surface of the bushing against the outside surface of the center element to eliminate lash. Shrinkage of the plastic in the closed circumferential chamber as it cures solid reduces the contact pressure between the inside surface of the bushing and the outside surface of the center element to minimize frictional drag.

BRIEF DESCRIPTION OF THE DRAWINGS

FIG. 1 is a fragmentary, partially broken-away view of a motor vehicle having a steering column according to this invention;

FIG. 2 is a fragmentary, enlarged sectional view taken generally along the plane indicated by lines 2—2 in FIG. 1;

FIG. 3 is an enlarged view of a portion of FIG. 2;

DESCRIPTION OF A PREFERRED EMBODIMENT

Figure 4:
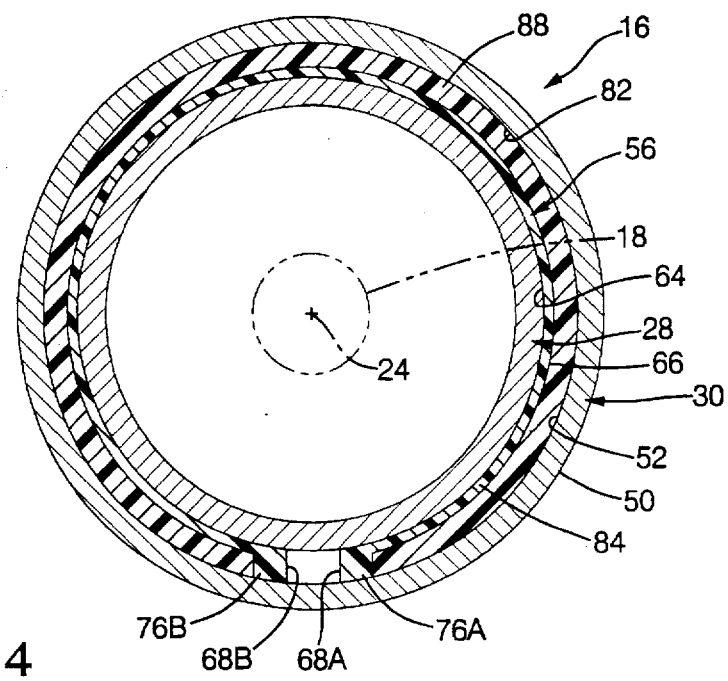
FIG. 4 is a sectional view taken generally along the plane indicated by lines 4—4 in FIG. 3.

Referring to FIGS. 1–2, a steering column 10 according to this invention is disposed in a passenger compartment 12 of a motor vehicle body 14 and includes a mast jacket 16, a schematically illustrated steering shaft 18, and a steering wheel 20. The steering shaft 18 is supported by bearings, including an upper bearing assembly 22, for rotation about a longitudinal centerline 24 of the steering column. The steering wheel 20 is rigidly attached to the steering shaft 18 outboard of the bearing assembly 22. The steering shaft 18 transfers manual effort applied at the steering wheel 20 to a steering gear, not shown, of the motor vehicle in the usual fashion and is collapsible in the direction of the longitudinal centerline 24 in response to an impact on the steering wheel.

The mast jacket 16 includes an inner element 26, a center element 28, and an outer element 30. The inner element 26 is a cylindrical tube having an outboard end 32 at which the bearing assembly 22 is rigidly supported and an inboard end 34. The center element 28 is a cylindrical tube having an outboard end 36 telescopically overlapping the inboard end 34 of the inner element 26. An energy absorber 38 such as described in U.S. Pat. No. 3,392,599, issued Jul. 16, 1968 and assigned to the assignee of this invention, is disposed between the inner and center elements 26, 28.

The energy absorber 38 includes a plurality of steel spheres 40 interference fitted in an annulus 42 between the inner and the center elements where they overlap. The spheres are loosely disposed in respective pockets of a cylindrical plastic ball sleeve 44 in the annulus 42. The interference fit of the spheres 40 in the annulus 42 and the span of the spheres in the direction of the longitudinal centerline 24 of the steering column permanently eliminates all lash between the inner and center elements 26, 28 and imparts substantial rigidity to the telescopic overlap therebetween with respect to beam bending perpendicular to the longitudinal centerline 24.

As seen best in FIGS. 2–5, the outer element 30 is substantially a cylindrical tube having an outboard end 46, an inboard end 48, an outer surface 50, and an inner cylindrical surface 52 defining a passage through the outer element between the inboard and outboard ends. The outboard end 46 of the outer element 30 telescopically overlaps an inboard end 54 of the center element 28. A bushing 56 is disposed in an annulus 58 between the center and outer elements 28, 30 where they overlap.

The bushing 56 is a right circular cylinder, preferably made of molded plastic, having an inboard end 60, an outboard end 62, an inside surface 64, and an outside surface 66. The bushing 56 is split between a pair of linear edges 68A, 68B parallel to the longitudinal centerline 24 of the steering column for flexibility and has a diametrically opposite pair of hooks 70A, 70B extending from its inboard end 60 parallel to the longitudinal centerline 24. An integral, continuous lip 72 on the bushing 56 raised from the outside surface 66 thereof includes a pair of circumferential segments 74A, 74B at the inboard and outboard ends 60, 62, respectively, of the bushing and a pair of linear segments 76A, 76B parallel to respective ones of the linear edges 68A, 68B of the bushing.

Figure 5:
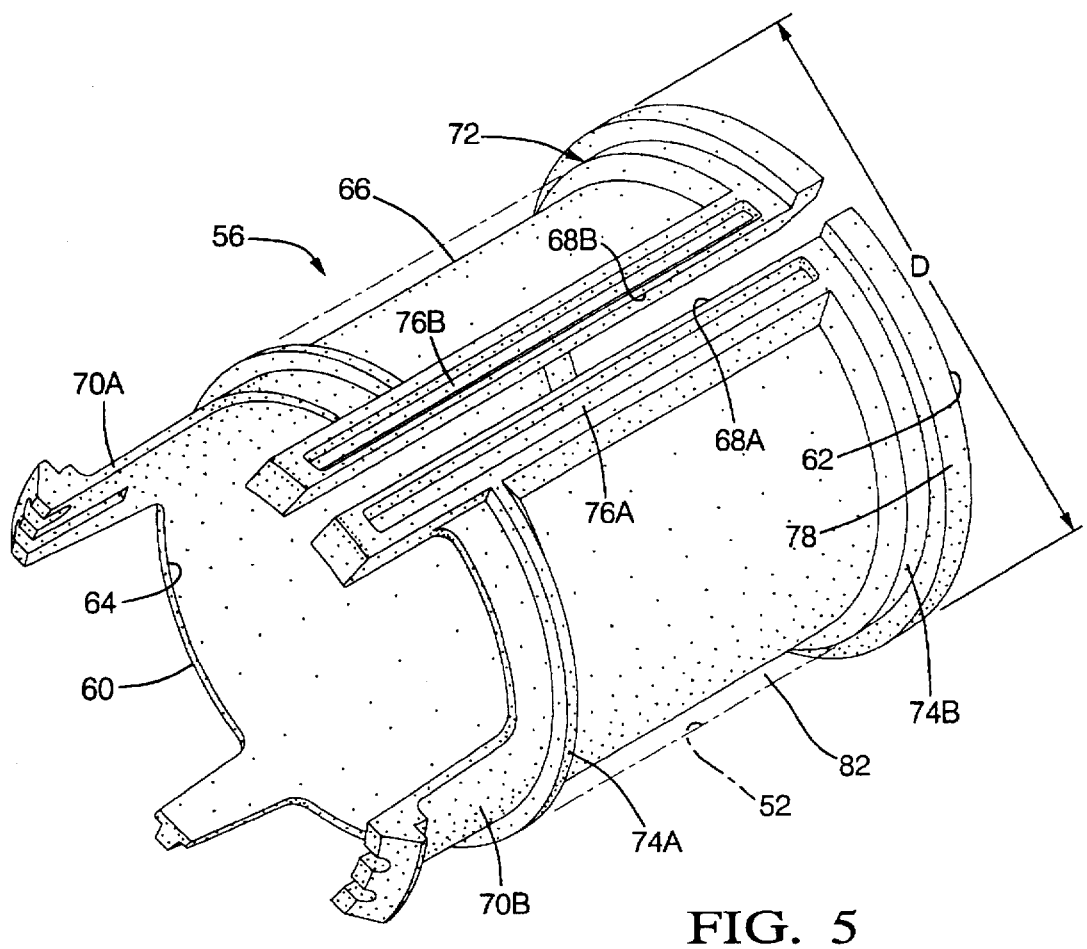
FIG. 5 is a perspective view of a bushing of the motor vehicle steering column according to this invention.

An outside diameter "D" of the bushing 56, FIG. 5, defined by the continuous lip 72 exceeds the diameter of the inner surface 52 of the outer element. The linear edges 68A, 68B of the bushing 56 are squeezed together by flexure of the bushing to reduce the aforesaid outside diameter and the bushing 56 is inserted in the inner surface 52 of the outer element through the outboard end 46 thereof until a flange 78 on the bushing engages the outboard end 46 and the hooks 70A, 70B resiliently snap into respective ones of a pair of slots in the outer element for retention of the bushing on the outer element, only a single slot 80 being visible in FIGS. 2 and 3.

When the force on the bushing 56 squeezing together the linear edges 68A, 68B is released, the bushing expands naturally until the lip 72 seats against the inner surface 52 of the outer element. The natural resilience of the bushing effects a seal between the lip 72 and the inner surface 52 so that the two cooperate with the outside surface 66 of the bushing 56 in defining a closed circumferential chamber 82 around the bushing interrupted only by the linear segments 76A, 76B of the lip. The diameter of the inside surface 64 of the bushing 56 when the lip 72 is seated on the inner surface 52 of the outer element 30 exceeds the diameter of an outer surface 84 of the center element 28.

As seen best in FIGS. 2–4, the inboard end 54 of the center element 28 extends into the bushing 56 about the length of the bushing with radial clearance attributable to the aforesaid difference between the diameters of surfaces 64, 84. Liquid plastic, such as acetal available from Hoecht Celanese, is injected into the closed chamber 82 through an injection port 86 in the outer element 30. The liquid plastic completely fills the closed chamber 82 and is confined therein by the seal at the lip 72.

The injection pressure of the liquid plastic, e.g., about 1000 psi, squeezes together the linear edges 68A, 68B until the inside surface 64 of the bushing bears flush against the outer surface 84 of the center element 28. The liquid plastic eliminates lash between the bushing and the outer element and, at the same time, induces enough friction between the outer surface 84 and the inside surface 64 to effectively immobilize the center element 28 relative to the outer element 30. However, as the liquid plastic cures to create a solid, formed in place plastic shim 88 between the bushing 56 and the outer element 30, the plastic shrinks to reduce the contact pressure between the inside surface 64 of the bushing and the outer surface 84 of the center element and thereby reduce frictional drag to a magnitude compatible with low effort linear translation between the center element 28 and the outer element 30.

As seen best in FIG. 1, the steering column 10 is attached to the body 14 of the motor vehicle through a schematically represented upper mount 90 and a similarly schematically represented lower mount 92. The lower mount includes a stationary bracket 94 on the body to which the outer element 30 of the steering column is either rigidly attached or, preferably, hinged for up and down pivotal movement about a centerline perpendicular to a vertical plane containing the longitudinal centerline 24 of the steering column.

The upper mount 90 includes a stationary bracket 96 rigidly attached to the body 14 having vertical side panels on opposite sides of the center element 28 of the steering column. A clamp, not shown, on the stationary bracket 96 between the side panels is actuated by a lever 98 such that when the lever 98 is in a released position, the inner and center elements 26, 28 are linearly translatable as a unit relative to the outer element 30 in the direction of the longitudinal centerline 24 of the steering column to vary the length of the steering column between a maximum and a minimum represented by solid and broken line positions of steering wheel 20 in FIG. 1. In addition, if the lower mount includes the aforesaid hinge, the steering column is pivotable up and down in the released position of the lever 98 to vary the vertical position of the steering wheel 20.

When the lever 98 is pivoted to a locked position, the center element 28 near the outboard end 36 thereof is rigidly clamped to the bracket 96 and, thereby, the body of the motor vehicle. In that circumstance, an impact on the steering wheel 20 is transferred by the steering shaft 18 to the inner element 26 and induces linear translation thereof relative to the center element 28 in the direction of the longitudinal centerline 24. Concurrently, the steel spheres 40 plastically deform the inner and center elements by rolling tracks therein to convert into work a fraction of the kinetic energy of the impact on the steering wheel 20.

Importantly, the bushing 56 provides a structurally stiff, i.e., lash-free, low effort sliding connection between the center and outer elements 28, 30 regardless of tolerance variations therebetween. The inner, center and outer elements 26, 28, 30 may, therefore, be made of seamless steel tube which is economical but which has correspondingly broad tolerances.

What is claimed is:

1. A motor vehicle steering column comprising:

a first mast jacket element adapted for attachment to a motor vehicle body, a cylindrical passage through said first mast jacket element, a second mast jacket element having a cylindrical outer surface extending telescopically into said cylindrical passage and cooperating therewith in defining an annulus between said first and said second mast jacket elements, a flexible bushing having a cylindrical inside surface and a cylindrical outside surface and a pair of linear edges on opposite sides of a split in said cylindrical bushing, a continuous lip on said cylindrical outside surface of said bushing, said bushing being disposed in said annulus with said cylindrical inside surface thereof facing said cylindrical outer surface of said second mast jacket element and compressively flexed so that said continuous lip bears against said cylindrical passage in said first mast jacket element to define a closed circumferential chamber around said bushing interrupted by said split in said bushing, and a solid plastic shim molded in place in said closed circumferential chamber by injecting liquid plastic into said closed circumferential chamber at an injection pressure operative to fill said closed circumferential chamber and to clamp said cylindrical inside surface of said bushing against said cylindrical outer surface of said second mast jacket element until shrinkage of the liquid plastic as it cures solid to form said plastic shim reduces the contact pressure and the corresponding frictional drag between said cylindrical inside surface of said bushing and said cylindrical outer surface of said second mast jacket element.

2. The motor vehicle steering column recited in claim 1 wherein:

said bushing is made of molded plastic.

3. The motor vehicle steering column recited in claim 2 wherein:

said continuous lip extends around substantially the periphery of said cylindrical outside surface of said bushing and is molded integrally with said bushing.

4. The motor vehicle steering column recited in claim 3 further comprising:

a third mast jacket element having a cylindrical outer surface telescopically extending into a cylindrical inner surface of said second mast jacket element and cooperating therewith in defining an annulus between said second and said third mast jacket elements, and an energy absorber means in said annulus between said second and third mast jacket elements operative to rigidly connect said second and third mast jacket elements except in response to an impact on said third mast jacket element in the direction of a longitudinal centerline of said steering column during which said energy absorber means is operative to permit relative linear translation between said second and third mast jacket elements in the direction of said longitudinal centerline while concurrently converting into work a fraction of the kinetic energy of said impact on said third mast jacket element.

5. The motor vehicle steering column recited in claim 4 wherein said energy absorber means comprises:

a plurality of steel spheres interference fitted in said annulus between said second and said third mast jacket elements operative to plastically deform said second and said third mast jacket elements by rolling tracks therein during relative linear translation between said second and said third mast jacket elements.

* * * * *